UNITED STATES PATENT OFFICE.

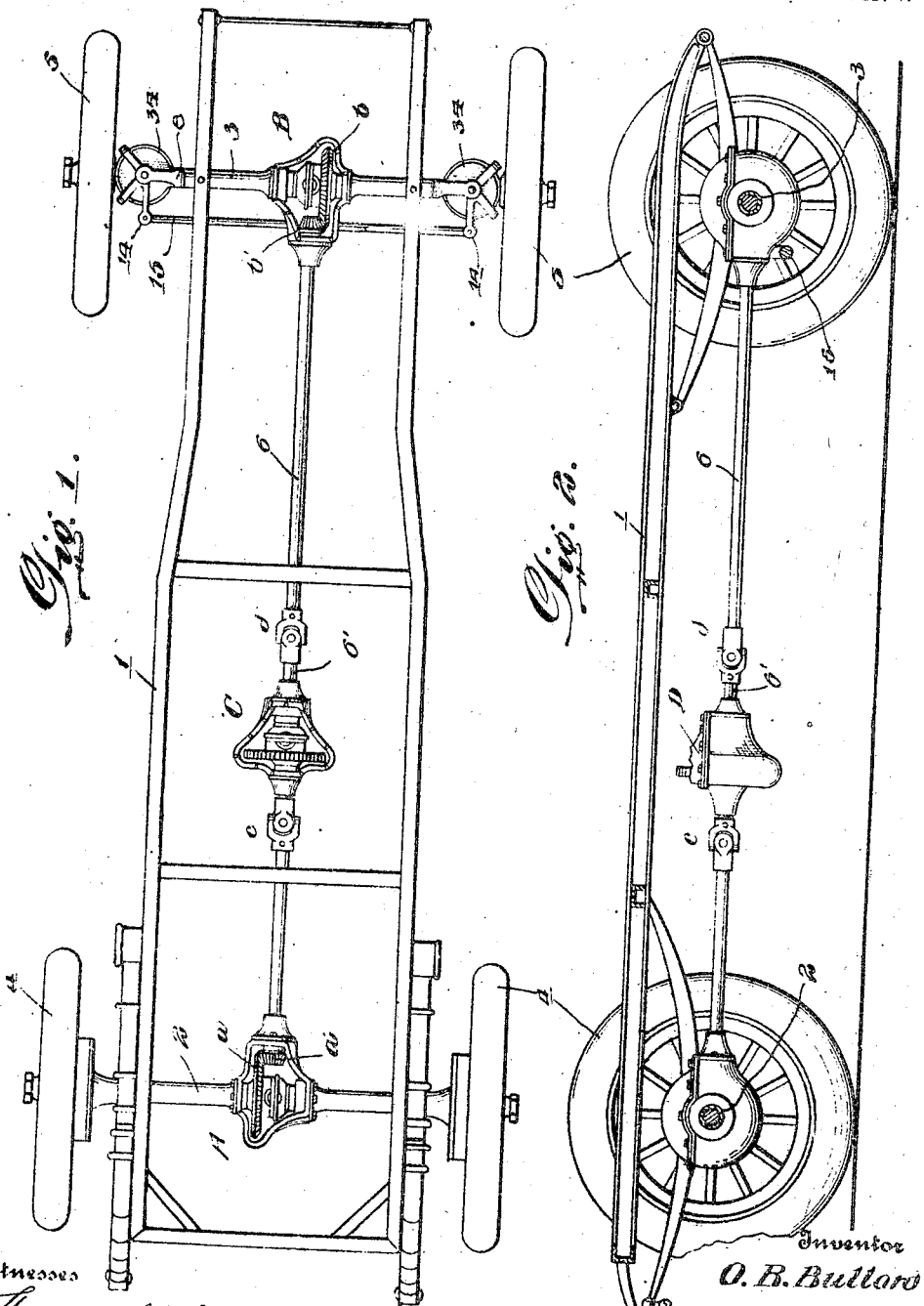

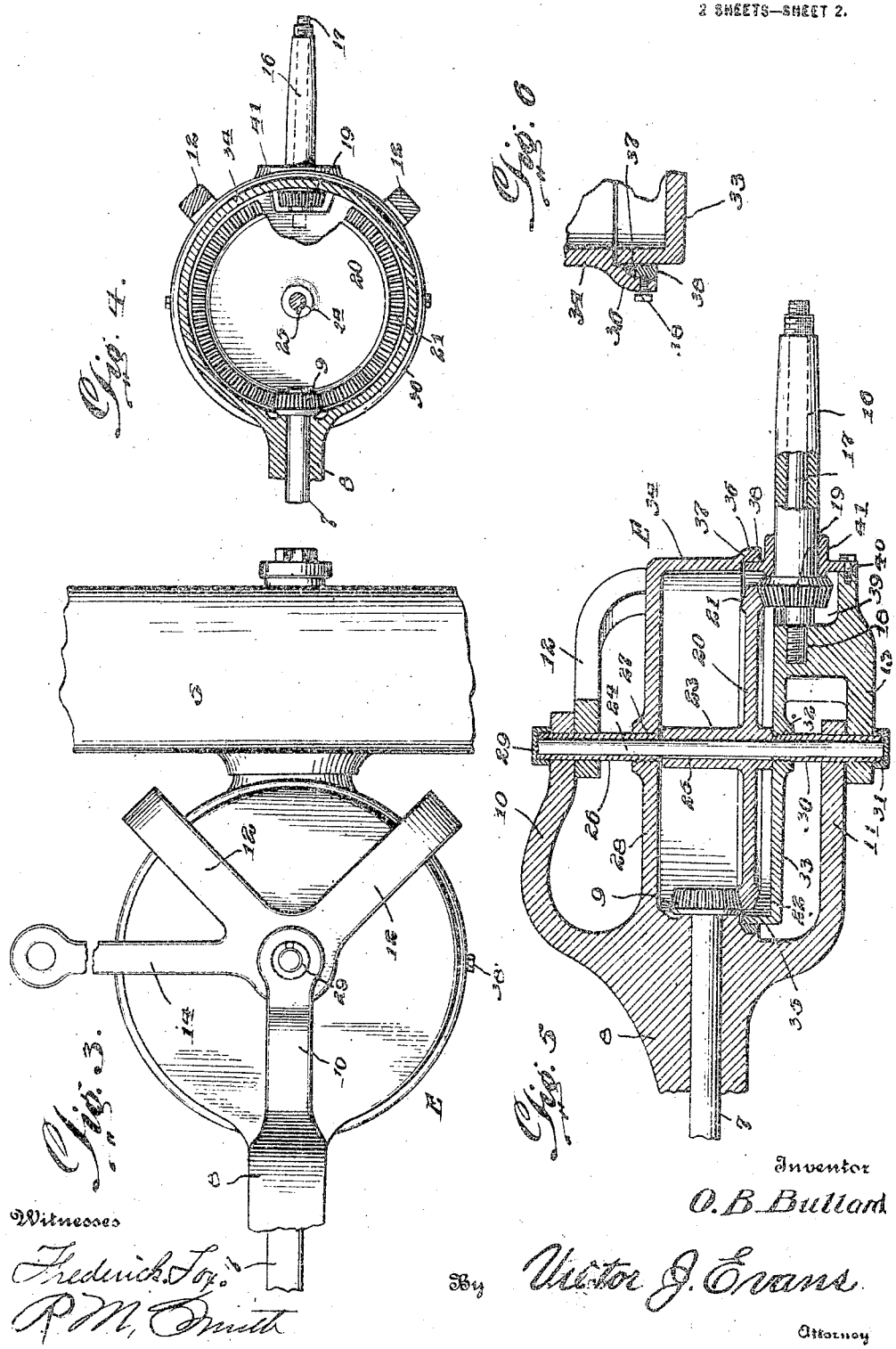

OTTO BERT BULLARD, OF SPALDING, NEBRASKA.

FOUR-WHEEL DRIVE MECHANISM.

1,179,799.

Specification of Letters Patent.

Patented Apr. 18, 1916.

Application filed May 1, 1915. Serial No. 25,266.

*To all whom it may concern:*

Be it known that I, OTTO B. BULLARD, a citizen of the United States, residing at Spalding, in the county of Greeley and State of Nebraska, have invented new and useful Improvements in Four-Wheel Drive Mechanism, of which the following is a specification.

This invention relates to four wheel drive mechanism for automobiles and similar vehicles, the object in view being to provide in combination with front and rear driving axles, driving mechanism for imparting rotary motion to the front and rear axles while at the same time providing for the variation in speed of the sections of both and enabling the driving power to be distributed equally to the front and rear wheels.

One of the principal objects of the present invention is to provide novel driving mechanism between the front axle and the front driving and steering wheels of the machine or vehicle, admitting of the ready turning of the steering wheel knuckles without interfering in the slightest with the driving mechanism for the front wheels, the invention also embodying a novel construction and relative arrangement of front axle housing and steering knuckles whereby the motion transmitting or driving gears are efficiently housed and protected from dust, dirt and other foreign matter, all parts of the transmitting gears between the front axle and the steering wheels being accessible and easily renewable.

With the above and other objects in view, the invention consists in the novel construction, combination and arrangement of parts, as herein described, illustrated and claimed.

In the accompanying drawings:—Figure 1 is a plan view of the frame and running gear of an automobile equipped with the present invention. Fig. 2 is a side elevation of the same partly broken away. Fig. 3 is an enlarged fragmentary plan view showing portions of one of the front steering wheels, a steering knuckle and the front axle and gear housings. Fig. 4 is a horizontal section through the same taken just above the gear on the driving axle. Fig. 5 is a vertical section taken about in line with the driving axle and wheel driving spindle. Fig. 6 is an enlarged fragmentary section illustrating the packing and compressing rings.

Referring primarily to Figs. 1 and 2, 1 designates the frame of an automobile or similar vehicle, 2 the rear axle housing, 3 the front axle housing, 4 the rear driving wheels, 5 the front driving and steering wheels and 6 a tumbling shaft connecting the rear differential gearing designated generally at A and the front differential gearing designated generally at B, the gearings A and B being identical in construction but disposed reversely to each other as shown in Fig. 1, that is to say, the main or large gear $a$ of the rear differential gearing faces in the opposite direction from the corresponding gear $b$ of the front differential gearing. This is done in order to distribute the weight equally and also equalize the strain or torque between the shaft 6 and the front and rear driving axles.

The shaft 6 is of sectional construction and is provided at its rear extremity with a pinion $a'$ meshing with the gear $a$ and is provided at its front extremity with a pinion $b'$ meshing with the gear $b$. The shaft 6 comprises an intermediate section $6'$ which is connected to the front and rear sections of the shaft 6 by means of universal joints $c$ and $d$. Associated with the central section $d$ which is divided between its ends, is what I term intermediate differential gearing C upon the top of which I prefer to mount the casing D of the transmission gearing from which the drive shaft of the machine extends forwardly to the clutch, the last named shaft not being shown.

Each section 7 of the front axle is mounted in an axle housing 8 as best illustrated in Figs. 3, 4 and 5 and has fast on its outer extremity a gear 9 shown in the form of a bevel gear. At each extremity, the front axle housing is provided with upper and lower fork arms 10 and 11 which are overlapped by the upper and lower fork arms 12 and 13 of the steering knuckle designated generally at E. In addition to the fork arms 12 and 13, there being two sets of such arms as indicated in Fig. 3, the knuckle E is provided with a knuckle arm 14 and the two knuckles for the front steering wheels, as shown in Fig. 1, are connected in the usual way by a rod 15 so as to cause an equal turning movement of both knuckles and therefore the front steering and driving wheels.

16 designates the wheel driving spindle on which one of the front steering and driving wheels is fastened, said spindle being journaled on a stud shaft 17 the inner end of which is threaded at 18 into the lower part of the steering knuckle E as shown in Fig. 5. The hollow spindle 16 revolves upon the stud shaft 17 and is provided at its inner end with a gear 19 shown in the form of a bevel gear.

20 designates a transmission gear which is provided with an upper gear face 21 and a lower gear face 22, the gear 9 meshing with the upper gear face 21 and the lower gear face 22 meshing with the gear 19 on the wheel driving spindle 16. The wheel 20 is provided with an extended hub 23 through which passes a knuckle pivot, pin or shaft 24 to which the wheel 20 is fastened by means of a key 25.

A bushing 26 is inserted through the upper fork arms 10 and 12 as shown in Fig. 5 and is threaded at 27 into the top wall 28 of the gear housing hereinafter referred to, the upper extremity of the bushing 16 being threaded to receive an internally threaded end cap 29. Another corresponding bushing 30 is inserted through the lower fork arms 11 and 13 and is threaded at its lower extremity to receive a cap 31 similar to the cap 29. The upper end of the bushing 30 is threaded at 32 into the lower section 33 of the gear housing. The pin or shaft 24 turns within the bushings 26 and 30 as the knuckle swings in the operation of steering the machine. These bushings may be renewed as they become worn.

The axle housing 8 is provided at each end thereof with an extension forming the upper section 34 of a gear housing and the knuckle E is also provided with an extension to form the lower section or portion 35 of the gear housing, the said sections 34 and 35 together forming a hollow cylindrical housing for the gears 9, 19 and 20. In order to effectively exclude dust, dirt and other foreign matter from the gear housing, the upper housing section 34 is flanged as shown at 36 to surround the lower housing section 33 and is also rabbeted as shown to receive a packing ring 37 and also internally threaded to receive an externally threaded packing compressing ring 38 the inner face of which rides against the outer face of the bottom housing section 33. The knuckle E is formed with a gear pocket 39 to receive the gear 19 above described and the outer end of said pocket is closed by a cap plate 40 which carries a bearing 41 for the vehicle driving spindle 16 as shown in Fig. 5.

From the foregoing description, taken in connection with the accompanying drawings, it will now be understood that the engine through the clutch and drive shaft imparts motion through the transmission gearing to the intermediate differential gearing designated at C and that the power applied thereto is delivered to the front and rear differential gearings by means of forwardly and rearwardly extending sections of the shaft 6. In this way driving power is equally distributed and applied to all four wheels of the machine. It will also be understood that the means for transmitting the rotary motion of the front axle sections to the front driving and steering wheels is accomplished by extremely simple gearing wholly inclosed within a housing the sections of which serve to exclude all dirt, dust and foreign matter and also retain oil or other lubricant therein in which the gears run. The parts of the gearing just referred to are accessible and renewable for the purpose of taking up wear.

What I claim is:—

In a four wheel drive mechanism for engine driven wheeled vehicles, the combination of a driven front axle, a housing for said axle having fork arms at each end thereof, a steering knuckle at each end of said axle having fork arms, a knuckle pivot connecting said fork arms of the axle housing and knuckle, a vehicle driving and steering wheel carried by each knuckle, a driving spindle for said wheel, a gear fast on said spindle, a gear fast on the adjacent end of the driving axle, and a motion transmitting gear journaled on said knuckle pin as a center and having two oppositely arranged gear faces one of which meshes with the gear on the driving axle, the other gear face meshing with the gear on the wheel driving spindle, said knuckle embodying an integral and cylindrical gear housing portion open at the top and the axle housing embodying a complemental gear housing portion open at bottom, one of said portions being enlarged to receive in overlapping relation an interfitting edge of the other portion, a packing ring carried by one of said portions, and a packing compressing and retaining ring also carried by the same portion.

In testimony whereof I affix my signature.

OTTO BERT BULLARD

Witness:
 BENNETT S. JONES.